June 21, 1966 A. W. CEYER ETAL 3,256,638
SLIDING DOOR COLLAPSIBLE EDGE GUARD
Filed Sept. 14, 1964
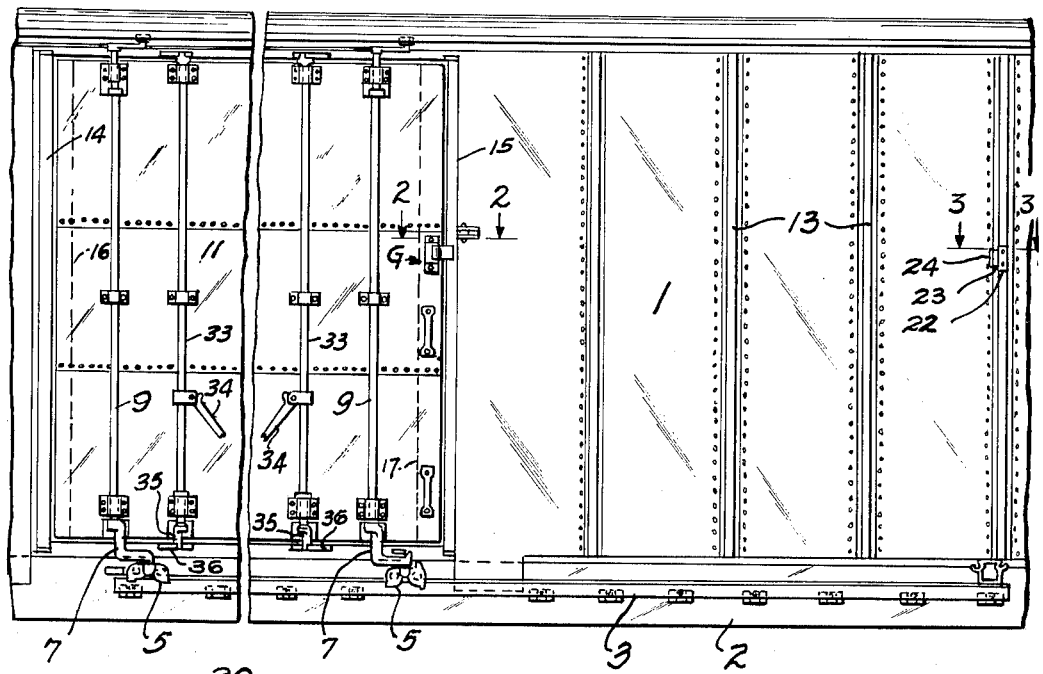
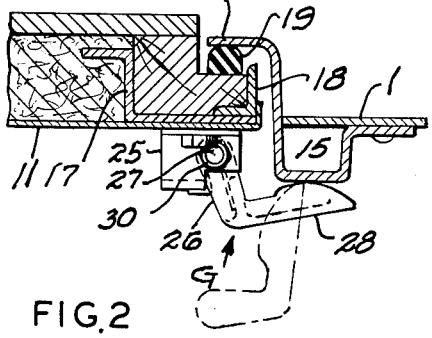
FIG.2
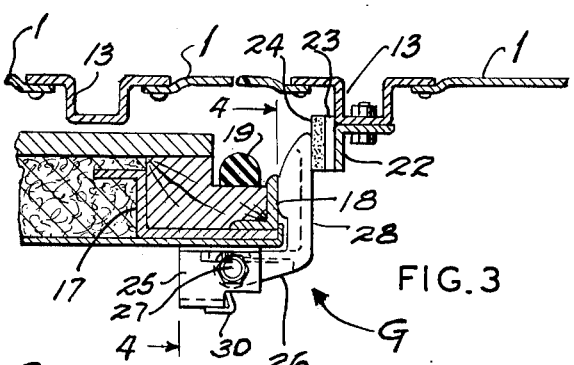
FIG.3
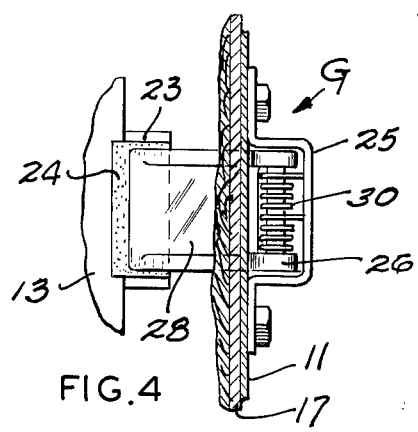
FIG.4
INVENTORS
Alfons W. Ceyer
Leonidas Taras
By Bedell and Burgess
ATTORNEYS.

United States Patent Office 3,256,638
Patented June 21, 1966

3,256,638
SLIDING DOOR COLLAPSIBLE EDGE GUARD
Alfons W. Ceyer, Berwyn, and Leonidas Jaras, Chicago, Ill., assignors to American Seal-Kap Corporation of Delaware, New York, N.Y., a corporation of Delaware
Filed Sept. 14, 1964, Ser. No. 395,998
6 Claims. (Cl. 49—219)

The invention relates to doors slidable alongside a wall to cover and uncover an opening in a wall, and more particularly, to a door which, in closing, also moves transversely of the wall to fit snugly into the opening and be flush with the wall. The sliding movement of such a door toward a wide open position is usually arrested by the rear edge of the door striking a bumper on the wall and, if the door is moving rapidly, the door edge may be damaged so as to interfere with the subsequent fit of the door into the opening. The rear edge of the door may be provided with a gasket of distortible material which engages a side wall post when the door is closed and effects a weathertight joint. Such a gasket should not contact the bumper because of likely damage particularly if the door edging is bent.

The main object of the present invention is to prevent damage to the door edging and associated gasket, when the door is opened, without interfering with the snug fit of the door in the door opening when the door is closed. The invention consists broadly in a car wall and door structure which includes a guard projecting automatically between the bumper and the edging and weatherstrip when the door is fully opened but is retracted from projecting position as the door moves into flush closing position.

In the accompanying drawings illustrating a selected embodiment of the invention:

FIG. 1 is an elevation of a car side wall with sliding flush door of the type referred to and equipped with a collapsible guard.

FIGS. 2 and 3 are detail horizontal sections on lines 2—2 and 3—3, respectively, of FIG. 1.

FIG. 4 is a detail vertical section on line 4—4 of FIG. 3.

Associated with the car side wall 1 and side sill 2 is a track 3 on which ride carriages 5 journaling cranks 7 which mount upright shafts 9 supporting a door 11. Locking shafts 33 are rotated by levers 34 to engage and disengage cams 35 with keepers 36 on the car body. Side wall 1 includes a plurality of intermediate posts 13 and spaced door posts 14, 15 which define a door receiving opening in the side wall. When door 11 closes the opening it is snugly received between front and rear door posts 14, 15. Preferably the door has front and rear framing members 16, 17, respectively. The rear framing member 17 mounts a rear edging 18. A gasket 19 of distortible rubber-like material secured to a wood filler on member 17 engages and is distorted by flange 20 on post 15 to effect a weather seal. When the door is to be opened it is unlocked and swung manually on cranks 7 for movement transversely of the wall outwardly of the opening between posts 14, 15 and then the carriages and door are moved along wall 1 to the right until the rear of the door engages a bumper which limits the door movement. The bumper is here shown as an angle 22 bolted or riveted to an intermediate post 13 and having welded or otherwise secured thereto a plate 23 mounting a rubber block 24. All the above is known construction.

The present structure includes a guard device G mounted on the door and automatically interposed between the rear edge of the door and the bumper when the door is opened (FIG. 3) and automatically moved clear of the rear edge of the door when the door is being closed (FIG. 2). The guard device includes a bracket 25 bolted or riveted to door rear upright framing member 17, a rigid L-shaped member having one leg 26, pivoted at its outer end to the bracket at 27, and another leg movable on pivot 27 to the positions shown in FIGS. 2 and 3.

One or more torsion springs 30 are distorted between the bracket and members 26, 28. When the door is moved into the door opening, springs 30 yield as leg 28 engages door post 15. When the door is moved out of the door opening springs 30 thrust leg 28 inwardly until it projects across the rear edge of the door, engaging edging 18 (FIG. 3) and disposed to engage the bumper when the door has fully uncovered the opening. In this position leg 28 spreads the blow from the bumper and avoids indenting edging 18 and damage to gasket 19.

With this strucuture the guard automatically assumes bumper-engageable position when the door is opened, but still remains within usual tunnel, bridge, and other structure clearance lines when the door is closed.

The details of this structure may be changed without departing from the spirit of the invention and the exclusive use of those modifications of the safety guard and its mounting coming within the scope of the claims is contemplated.

What is claimed is:

1. A bumper and edge guard for a sliding door, comprising a support bracket having an inner face adapted for application to the outer face of a door, an L-shaped member with one leg having a pivot at its outer end to the bracket, and the other leg having a bumper-engaging terminal at its outer end, the member being movable on said pivot between a position, in which the pivoted leg extends alongside the outer face of the bracket and the other leg extends transversely of the bracket and projects beyond the plane of the inner face of the bracket, and a position in which the pivoted leg extends substantially normal to the bracket and the second-mentioned leg extends substantially parallel to the general plane of the bracket and is spaced outwardly therefrom, there being means yieldingly thrusting said member into the first-mentioned position on the bracket.

2. In combination with a sliding door having a marginal portion including an upright rear edging, a bumper-engageable guard member having a pivot on said marginal portion and movable about its pivot to a position, in which it projects transversely of said rear edging and protects the same from contact with a bumper, and to a position to clear said edging transversely of the length of the door to accommodate the movement of the door transversely of its plane into a wall opening.

3. In combination with a sliding door having an upright rear edging, a guard for the edging comprising a member pivoted on the door near said edging and movable to an inner position, projecting across the edging, and to an outer position spaced from the edging transversely of the general plane of the door, there being spring means thrusting the guard to the first-mentioned position, the swinging end of the member having a part facing the door and facilitating travel of the member over a wall along which the door moves forwardly.

4. In a railway car door having an upright rear edging, a distortible gasket on the inner face of the door and offset inwardly from said edging, a guard member of L-shape having one leg pivoted to the outer face of the door opposite to said gasket and having another leg disposed normal to said pivoted leg, a spring anchored to the door and thrusting said member about the pivot on the door to dispose said first-mentioned leg alongside the door and the second-mentioned leg transversely of the door in engagement with said door edging and projecting inwardly from the door beyond said gasket.

5. In combination, a car side wall having a door opening, an upright post at each end of said opening, a door movable to fit in said opening flush with the wall and having a rear upright framing member adjacent one of said posts and provided with a gasket of distortible material seated against said post, the door being movable transversely of the wall out of said opening and slidable alongside the wall past said post to uncover said opening, a bumper on the wall spaced from the opening and in the path of the sliding door, and a member pivoted on the outer face of the door near the rear edge of the latter and projecting across and in contact with said framing member when the door is out of said opening in position to strike the bumper and thereby guard said framing member and gasket against contact with the bumper, said member being movable on its pivot away from the door framing member by sliding engagement with said post as the door is moved abreast of and into said opening.

6. In a railway car, a body side wall including upright side posts on the exterior thereof, one of said posts defining the rear end of a door opening in the wall, a door mounted on the car body to move alongside said wall and transversely thereof into said opening flush with said wall, a stop on the wall with a portion projecting outwardly therefrom beyond the plane of the outer faces of said posts and limiting sliding movement of the door along the wall away from the opening, a stop-engageable guard pivoted on the door and spring thrust about its pivot to a position between said stop portion and the door, when the door is fully opened, and automatically movable by its engagement with said door one post to clear the rear of the door as the door is moved into said opening.

References Cited by the Examiner
UNITED STATES PATENTS 344,746    6/1886    Moore _____ 20—23

HARRISON R. MOSELEY, *Primary Examiner.*

A. I. BREIER, *Assistant Examiner.*